(12) United States Patent
Karpetsky et al.

(10) Patent No.: US 7,497,929 B2
(45) Date of Patent: Mar. 3, 2009

(54) PYROLYTIC CONVERSION OF SCRAP TIRES TO CARBON PRODUCTS

(76) Inventors: Timothy P. Karpetsky, 8219 Ruxton Crossing Ct., Towson, MD (US) 21204; R. William Mengel, 1712 Boswell Dr., Laramie, WY (US) 62070

(*) Notice: Subject to any disclaimer, the term of this patent is extended or adjusted under 35 U.S.C. 154(b) by 412 days.

(21) Appl. No.: 10/925,474

(22) Filed: Aug. 24, 2004

(65) Prior Publication Data
US 2005/0023124 A1 Feb. 3, 2005

Related U.S. Application Data

(63) Continuation-in-part of application No. 10/040,401, filed on Jan. 9, 2002, now abandoned.

(51) Int. Cl.
*C10B 57/00* (2006.01)
(52) U.S. Cl. .............. 201/17; 423/449.7; 422/150; 241/1
(58) Field of Classification Search .......... 423/449.7; 201/17; 422/150; 241/1
See application file for complete search history.

(56) References Cited

U.S. PATENT DOCUMENTS

| | | | | | |
|---|---|---|---|---|---|
| 4,131,238 | A | * | 12/1978 | Tarpley, Jr. | 241/30 |
| 4,839,151 | A | * | 6/1989 | Apffel | 423/449.7 |
| 5,506,274 | A | * | 4/1996 | Brown | 521/41 |
| 5,894,012 | A | * | 4/1999 | Denison | 422/150 |
| 6,726,133 | B2 | * | 4/2004 | Hahn et al. | 241/1 |

* cited by examiner

*Primary Examiner*—N. Bhat
(74) *Attorney, Agent, or Firm*—Roland H. Shubert

(57) ABSTRACT

A char containing less than 5% volatile matter is produced by pryolyzing shredded scrap vehicle tires and other rubber scrap material in an externally heated retort until the rubber is completely decomposed and until the temperature of the gases produced by the pyrolysis process reaches at least 500° C. The char is then subjected to resonance disintegration of an intensity sufficient to produce an unltrafine, particulate carbon product. In a preferred embodiment, essentially 100% of the individual carbon product particles are smaller than about 8 microns, and that product displays a dispersion coefficient in rubber of greater than 87%. The surface properties of the carbon product particles may be further modified by reacting or coating the carbon with chemical compounds or coating agents during or immediately after the resonance disintegration to tailor the properties of the carbon product to its use.

15 Claims, 7 Drawing Sheets

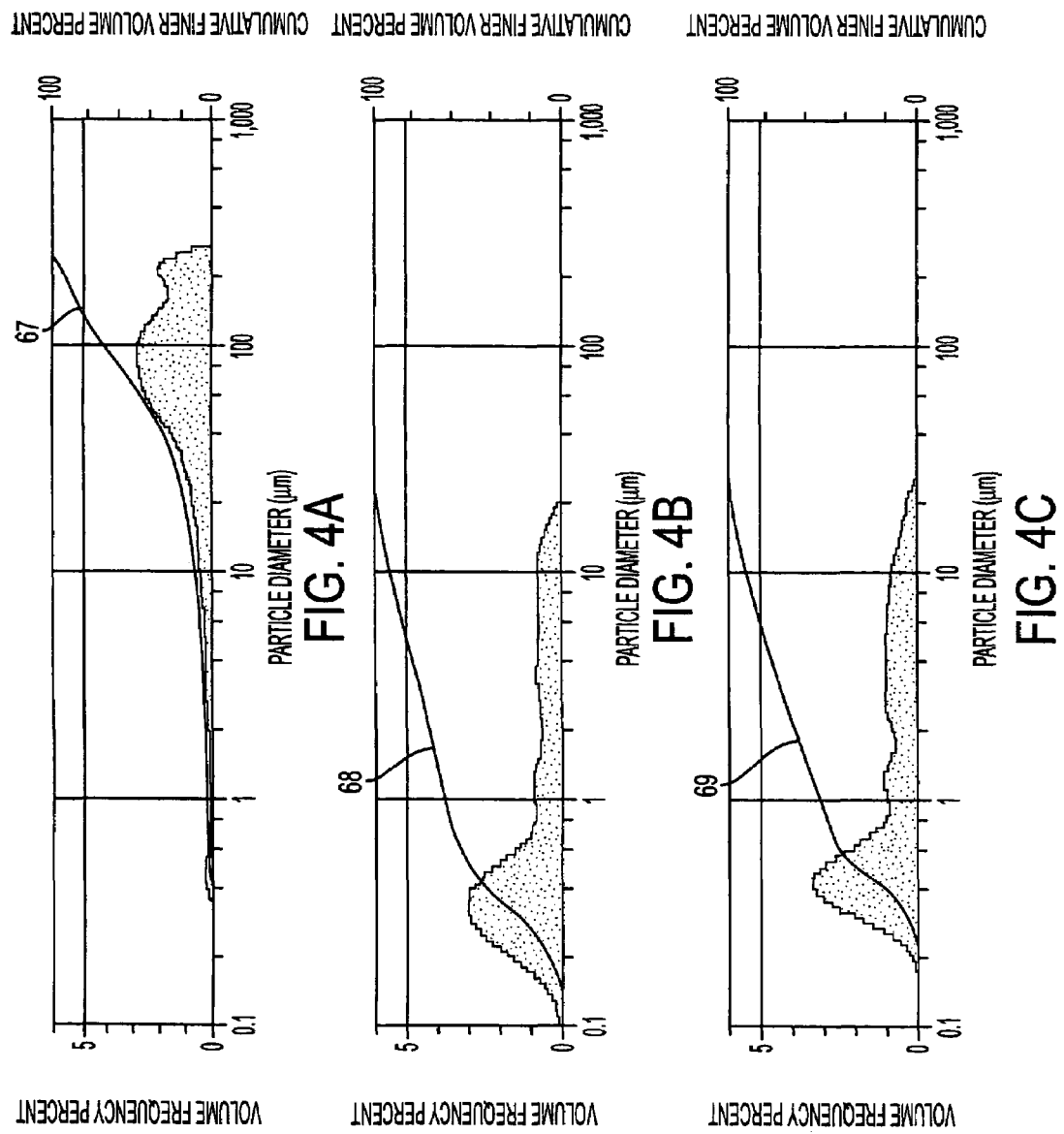

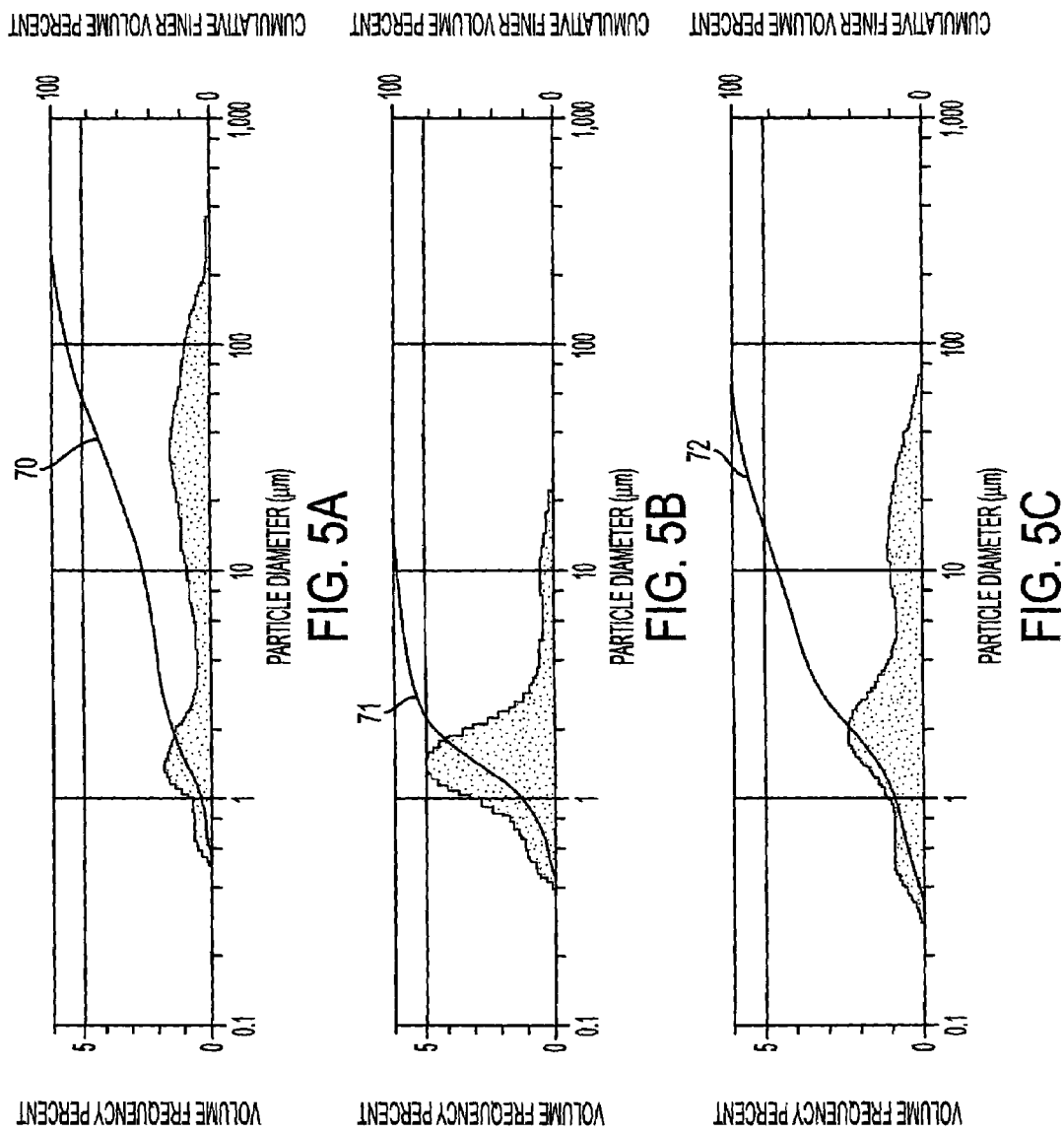

_US 7,497,929 B2_

PYROLYTIC CONVERSION OF SCRAP TIRES TO CARBON PRODUCTS

This is a continuation-in-part of application Ser. No. 10/040,401 filed Jan. 9, 2002 and now abandoned.

BACKGROUND OF THE INVENTION

1. Technical Field

This invention relates to a method for processing scrap tires and other discarded rubber items to obtain useful carbon products therefrom.

More specifically, this invention relates to a method for pyrolyzing scrap tires and other discarded rubber items to obtain a char, and to the further processing of that char to obtain carbon products suitable for use in a wide variety of industrial applications.

2. Description of Related Art

The pyrolytic conversion of scrap tires to obtain char and liquid and gaseous decomposition products is well known in the art. Such processes promise a useful and environmentally friendly solution to the disposal of a significant portion of the estimated 700 million scrap tires generated worldwide each year. However, to be economically successful, the process would have to be primarily supported through the sale of carbon based products in commodity markets. That has proven to be a significant barrier.

Pyrolytic char particles usually display a very wide size range, from less than one micron to more than one millimeter. The principal difficulty experienced in processing such char to obtain commercially acceptable products has been to obtain a very finely divided material of narrow particle size range having properties useful in rubber, elastomers, inks, pigments and plastics.

Attempts to obtain a commercially acceptable carbon product are well documented in the prior art. One such approach is described in U.S. Pat. No. 3,644,131 to Gotshall. The Gotshall patent asserted that a carbon product equivalent in quality to high grade carbon blacks can be obtained by retorting scrap tires and then comminuting the resulting char using a fluid energy mill to obtain a product having an average particle size of less than about 2.5 microns. The fluid energy mill used by Gotshall operated on steam at a temperature of about 450° F. at the nozzle exit. His mill was arranged with opposed nozzles to cause the carbon particles carried in a first stream to impinge at sonic velocity upon carbon particles carried in a second stream causing autogenous grinding of the colliding particles. The finely divided carbon product was then coated with a portion of the heavy oils from the retort to obtain a stable product.

Fader, in U.S. Pat. No. 5,037,628, disclosed a process that is generally similar to that of Gotshall in that tires were pyrolyzed in a retort to obtain a char, and a finely divided carbon product was produced from that char. Fader found that his char consisted of agglomerations, or clusters, of finer carbon particles mixed with unitary grit like particles. A carbon product, asserted to be comparable to commercial grade carbon blacks, was obtained by agitating the char to selectively de-agglomerate the carbon clusters without affecting the unitary particles which were thereafter separated from the smaller carbon particles. An air swept hammer mill, modified to provide only agitation, was used to de-agglomerate the carbon clusters. Data presented in the patent showed that the char material after de-agglomeration displayed a particle size range in which 90% of the particles were less than 150 microns in size.

Yet another approach for obtaining useful products from scrap tires and other waste rubber is described in U.S. Pat. No. 5,506,274 to Brown. The Brown patent states that particles of carbon black encapsulated in spheres of rubber are produced by passing small particles of waste rubber containing carbon black through a rotating or oscillating retort that is operated at a preferred temperature range of 500° F. to 850° F. Brown further teaches that dwell time of the waste rubber in passing from the entrance end to the exit end of the retort is critical to the proper formation of his desired spherical rubberized carbon black, and that the dwell time should be approximately 35-40 seconds.

The problems experienced with existing approaches to the pyrolytic processing of scrap tires have served to limit their usefulness and success. There remains a high degree of uncertainty regarding the economic feasibility of pyrolysis for recycling scrap tires. In fact, in May 2002, the Rubber Manufacturers Association stated that since 1985, a total of 75 pyrolysis projects have been announced, patented, licensed and promoted. Of those 75 projects, four were actually built and, as of May 2002, there were no commercially operational pyrolytic facilities in the United States, Canada, Japan, or Europe.

The large capital costs and high operating expenses of a fluid energy mill as was proposed by Gotshall makes that approach commercially impractical. Also, the grinding of char is a very demanding process. It requires production of a very fine and abrasive product at rates of one ton or more per hour on a continuous, day in and day out basis using simple, fool-proof equipment in order to be economically viable. The low yield of fine material obtained by de-agglomeration in the manner taught by Fader et al diminishes the attractiveness of that approach. It is very difficult, if not impossible, to dry-sieve carbon black because of its electrostatic properties as would be required were the Brown process to produce carbon black-like products rather than rubberized spheroids.

As may be readily appreciated, a process which alleviates and overcomes the technical deficiencies inherent in present practices and which produces high-value, marketable products would be a significant advance in the art.

SUMMARY OF THE INVENTION

Scrap tires are debeaded, shredded, steel wire is separated from the shredded rubber, and the rubber is then pyrolyzed in a retort to obtain a volatiles fraction and a char residue that contains less than 5% volatile matter. No intact rubber remains, either on the carbon, or separate from it. The volatiles are condensed, and the condensed liquid may be further processed to obtain marketable products while the non-condensed gas may be burned as a fuel. Char from the retort is subjected to resonance disintegration to produce a finely divided carbon product that is superior in properties to carbon obtained by means of conventional comminution techniques. The surface characteristics of the carbon product, or of carbon blacks produced by conventional techniques, may be further modified to obtain a wide variety of special purpose carbons by subjecting the carbon particles to chemical reaction during or immediately after the resonance disintegration. Alternatively or additionally the carbon product may be treated with organo-metallic coupling agents or other chemicals binding to functional groups on the carbon product surface to render the carbon more easily dispersible in different liquid vehicles for use in plastics, elastomers, inks and similar products.

BRIEF DESCRIPTION OF THE DRAWING

FIG. 4A is a plot of volume frequency vs. particle diameter of pyrolytic char dispersed in water before resonance decomposition;

FIG. 4B is the pyrolytic char of FIG. 4A dispersed in water after a first resonance decomposition;

FIG. 4C is the pyrolytic char of FIG. 4B dispersed in water after a second resonance decomposition;

FIG. 5A is a plot of volume frequency vs. particle diameter of the pyrolytic char of FIG. 4 dispersed in isopropanol before resonance decomposition;

FIG. 5B is the pyrolytic char of FIG. 5A dispersed in isopropanol after a first resonance decomposition;

FIG. 5C is the pyrolytic char of FIG. 5B dispersed in water after a second resonance decomposition;

DESCRIPTION OF PREFERRED EMBODIMENTS OF THE INVENTION

Figure 1:
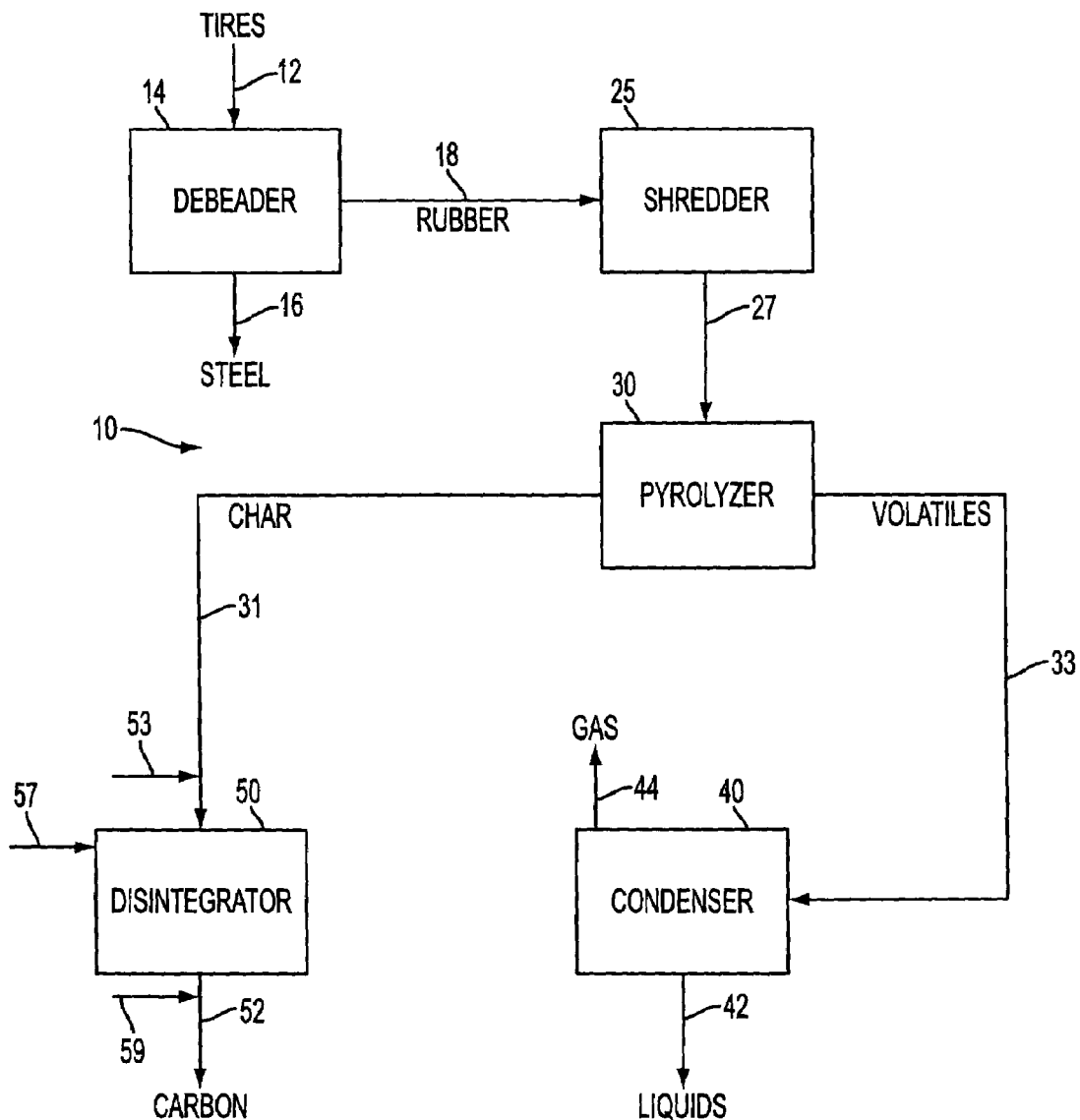
FIG. 1 is an illustrative flow sheet setting out the basic unit operations that make up the process and produce the novel products of this invention.

This invention utilizes a relatively low temperature pyrolysis of rubber scrap, or suitably shredded scrap vehicle tires, to obtain a coarse, granular char that consists essentially of carbon with no rubber. The char is then subjected to a size reduction step by means of resonance disintegration to obtain commercially useful carbon materials. Illustrative and preferred embodiments of this invention will be described in relation to the flowsheet 10 that is depicted in FIG. 1 of the drawing.

Referring now to FIG. 1, scrap vehicle tires 12 are first debeaded at 14 to separate the wire reinforcement in the tire bead from the remainder of the tire carcass. A steel fraction 16, comprising the reinforcing wire, is collected from the debeading operation while the debeaded tire 18 is passed to a shredder 25. Shredder 25 mechanically chops the debeaded tire into relatively small pieces or shreds 27 that suitably are no larger than about 50 mm in greatest dimension.

Shreds 27 are then passed to a pyrolyzing operation 30 wherein the rubber shreds are heat decomposed to obtain a char fraction 31 and a volatiles fraction 33. The pyrolyzing operation is preferably carried out in batch fashion using an externally heated rotating retort closed to the atmosphere but having an exit port to remove pyrolysis gases for further treatment. The use of a rotating retort is preferred in that it ensures even heating of the rubber and char product and also tends to prevent warping or cracking of the retort. Successive charges of shredded rubber are sealed into the retort which is then heated until the rubber is pyrolyzed and emission of volatiles diminishes. Pyrolysis is ordinarily considered to be complete when the gas flow diminishes and the retort charge, as measured by the temperature of the pyrolysis gases exiting the retort, is at a temperature in the range of 450° to 650° C. The retort is then cooled, the char discharged, and a new charge of shredded rubber is loaded.

A high quality carbon product, that displays properties comparing well to standard, commercially available, furnace carbon blacks used in the rubber and other industries, is obtained through close control of the pyrolysis conditions. The char produced in the pyrolysis operation must contain less than 5% volatile matter. It has been found that, to meet that requirement using a shredded tire feed, retorting must continue until the pyrolysis gases exiting the retort reach a temperature above approximately 500° C. The heating rate must be such that the pyrolyzing charge and the pyrolysis gases generated remain in close equilibrium. In practice, the heating rate for a rotating retort holding a four to five-ton charge of shredded rubber scrap is such that a complete run, from loading a charge of shredded scrap at ambient temperature into the retort to completion of pyrolysis, takes between three and four hours. It was found that the highest quality char was obtained by heating the charge from ambient to 330° C. in approximately 1 hour; from 330° C. to 450° C. in 1.9 to 2.0 hours; and from 450° C. to 540° C. in 0.55 to 0.6 hour, for a total pyrolysis time of 3.5 hours. Those temperatures and times were derived empirically. Temperature measured was that of the pyrolysis gas exiting the retort, and that temperature serves as a reliable indicator of the time that pyrolysis is complete.

There is no standard test to determine volatile matter in pyrolysis char. For the purposes of this disclosure, volatile matter will be defined in accordance with the test protocol that applicants have used for that purpose. That test protocol is a modification of ASTM D 1509-95 for determining the heating loss for carbon black. A suitable quantity of char product, conveniently 5 g, is dried by heating at 110° C. for three hours. The dried sample is then heated in a non-combustible atmosphere to a temperature of 975° C., and held at that temperature for seven minutes. After cooling, the sample is weighed and the loss of weight is reported as a percentage of the original sample weight.

Volatiles fraction 33 that is generated by the pyrolysis operation is passed to a condenser 40 to obtain a liquid product 42 and a non-condensable gas 44. Liquid 42 may be further processed by distillation and other refining techniques to obtain commercially useful products. The gas stream 44 contains combustible compounds and typically has a heating value about half that of natural gas. It preferably is burned on-site as process fuel to provide heat for the pyrolyzing operation and other similar uses.

Char fraction 31 is then subjected to resonance disintegration in means 50 to convert the char to an ultrafine carbon product 52. Resonance disintegration does not work well with elastic materials such as rubber or rubberized particles. The use of resonance disintegration to comminute the pyrolytic char that is free of all rubber is critical to the successful practice of this invention as it produces a very finely divided carbon product that has commercially desirable properties not obtainable using conventional milling or comminution techniques. Resonance disintegration means 50 comprises a machine that uses a plurality of spinning rotors within a multisided chamber to cause rapid compression and decompression of gas and particles as the materials pass through the machine. The spinning rotors also generate a large flow of air or other supplied gas that enters the machine through a feed port or tube located either at the top or the bottom of the machine depending upon its configuration. Materials to be disintegrated are introduced into the feed port and are carried through the machine in the flowing gas. Powerful shock waves are produced by the compression and decompression of the air and those shock waves impart destructive resonance to particles as they pass through the machine. One suitable resonance disintegration means for use in this invention is described in U.S. Pat. No. 6,135,370 that issued on Oct. 24, 2000 to Charles A. Arnold. The entire disclosure of that patent is incorporated by reference herein.

Resonance forces developed in means 50 may be augmented by vortex-generated shearing forces that are phased for delivery just at the time that particles approach and exceed their inherent limit of elasticity. The intensity of the resonance forces generated may be controlled by varying the rotational speed of the rotor over a range generally between 3,000 and 6,500 rpm. Once the elastic limit of a material is exceeded it shatters along planes of weakness that may be along a crystal plane or cleavage plane. Hard, crystalline materials with little elasticity are therefore readily micronized while highly elastic materials such as certain types of rubbers and plastics are more resistant to fragmentation. Upon analysis of the forces described above it is clear that particle size reduction in means 50 is accomplished in a different manner than that obtained through crushing and impact forces imparted in hammer, ball and jet mills.

Particulate char solids are carried through disintegration means 50 entrained in a gaseous medium 53 that is introduced with the char. Residence time of char particles in means 50 is very short; typically less than one second. The gaseous medium 53 may be atmospheric air, nitrogen, carbon dioxide, steam, and a variety of other gases and gas mixtures. There is very little contact between the solid char particles and the component parts of means 50, and that results in very little machine wear and very little contamination of the carbon with metals abraded from the machine.

Experimental data suggest that surface modification of the carbon particles takes place during resonance disintegration in air even at ambient temperature. Resonance disintegration causes a significant size reduction in both commercial carbon blacks and in pyrolytic char as determined when the materials are dispersed in water. Different degrees of particle fineness and differing surface chemistries can be obtained by adjustment of the resonance disintegration to obtain a broad range of different carbons that are useful in a range of different applications. Examination of the samples of both feed char and resonance-disintegrated product by means of scanning tunneling microscopy reveal distinct differences in carbon particle morphology after passage of the char through the resonance disintegration means. The carbon particles processed by resonance disintegration appeared fragmented, with fissures in the surface, compared to unprocessed particles. Pictures of resonance disintegrated pyrolytic char taken using atomic force microscopy (AFM) and transmission electron microscopy (TEM) show material similar in size and shape to a variety of standard carbon blacks. Particle statistical analysis of 10 TEM images from pyrolytic char produced by resonance disintegration, processed once or twice, showed that carbon agglomerates were slightly larger (15%±2%) after the second processing. Granules of standard carbon or of agglomerates of the pyrolytic char are broken down in water and typically about 50% of the resulting carbon material has a particle size less than one micron. Dispersions of those same carbon powders in isopropanol display particle size distributions and size trends that are quite distinct from those in water. The submicron fraction has never been observed to be a significant portion of total particulate volume of resonance disintegrated samples of either a standard carbon black or pyrolytic char when dispersed in isopropanol. Most of the product is distributed in the 1-3 µm range. Also, there is a growth of presumed agglomerates sized above about 5 µm after initial resonance disintegration processing of a standard carbon black, and upon successive resonance disintegration treatments of pyrolytic char.

X-ray photoelectron spectroscopy (XPS) analysis clearly shows that different surface chemical changes take place on different carbons as they are subjected to resonance disintegration. The differences seen upon use of different dispersion solvents also provide useful information about the surface properties of the carbon particles. Water is a solvent having proton donor properties that are relatively more pronounced than its acceptor properties, while isopropanol is a strong proton acceptor and donor and provides hydrophobic regions. Because the carbon particles tend to solvate and deagglomerate in water and because those same particles have more of a tendency to stick together or agglomerate in isopropanol, it appears that the carbon surface becomes more hydrophilic with resonance disintegration. Dispersion in water then gives a more accurate measure of the size reduction obtained through resonance disintegration than does dispersion in other solvents such as isopropanol. The hydrophilic nature of the carbon particles that results from resonance disintegration also points to the potential usefulness of the unique carbon products obtained as pigments in water-based printing inks.

It has also been found that other types of surface modification of the carbon particles can readily be accomplished by contacting the carbon with an appropriate reactant compound during or immediately after resonance disintegration. Properties of the carbon that can be modified include conductance, pH, wetability/dispersion, size, and interaction with other molecules when used as a filler. It is possible to carry out a number of different types of reactions while or after the char is passed through resonance disintegration means 50. A first type of reaction is that which exploits Van der Walls forces between the carbon substrate and a reactant molecule to bind materials to the surface of carbon particles. The reactant molecule, for example, may be a polynuclear aromatic hydrocarbon that has acidic, basic, neutral or other functional groups attached. Polynuclear aromatic hydrocarbons bind to carbon particles and are only removed at high temperature.

A second class of reaction that is useful in modifying carbon properties are those which involve a chemical reaction between functional groups present on the carbon substrate and those carried on a reactant molecule. Typical functional groups that may be employed include —$CO_2H$, —COCl, —OH, —$NH_2$, and –$SiR_2Cl$. It is preferred that the functional groups carried on the reactant molecule be highly reactive because the irreversible reaction between the functional groups and the carbon surface can be nearly instantaneous and the consumption of the reactant molecule is therefore substantially complete. Typical reactant molecules include peroxides, chlorosilanes, and acid chlorides.

Treatment of the resonance-disintegrated carbon product with certain organo-metallic compounds, particularly those compounds known in the trade as coupling agents, is another useful approach to the production of special purpose compositions. Coupling agents act as molecular bridges at the interface between two substances, one substance being a carbon particle and the other substance being either a liquid or another solid. Particularly preferred coupling agents include liquid multi-functional titanates, zirconates and aluminates such as, for example, alkyl titanates. Treatment may be accomplished by spraying an atomized coupling agent into a fluidized or otherwise agitated suspension of carbon particles. The amount of coupling agent required for treatment is small, enough to form at least a partial monomolecular layer on the surfaces of the carbon particles. That amount is generally in the range of about 0.1% to 1.0% based upon carbon weight. Carbon particles treated in that manner can be easily prepared as a paste concentrate having from about 10 to 35 weight percent solids in a selected liquid vehicle. The concentrate can then be diluted with additional quantities of the liquid vehicle to form an ink. The liquid vehicle may be water, or it may be any one of a variety of organic solvents, including, for example, alcohols and paraffinic or aromatic solvents.

Yet another kind of reaction that may be used to modify carbon surfaces are those which employ photochemical reactions between the carbon surface, or functional groups on the carbon surface, and a functionalized reactant molecule. Those reactions are extremely rapid and essentially total consumption of the reactant can be obtained without need for a purification step to remove excess reactant.

No matter the type of reaction employed, the reactant material may be introduced into the system at various locations, just before means 50 at location 53, into an upper area of means 50 at location 57, or at the exit of means 50 at location 59. It is generally advantageous to introduce the reactant material at location 59 so that the reaction takes place immediately after the resonance disintegration with char having freshly prepared surfaces.

It is also possible to modify the surface of the carbon particles by coating that surface with a non-reactive material such as a mineral oil or other petroleum oil that may be introduced into means 50 at location 53, 57 or 59 as a fine liquid stream. A coating agent will serve to change the wetability of the carbon surfaces and thus enhance the ease of dispersion of the carbon into a substrate material. It can also influence the color of the carbon when used in ink formulations.

In another embodiment of this invention, resonance disintegration is employed to modify the properties of carbon blacks produced in conventional fashion by the incomplete combustion or thermal decomposition of natural gas or petroleum liquids. In this embodiment of the invention, the commercial carbon product is substituted for char stream 31 as a feed to resonance disintegration means 50. As was described with reference to a char feed, the surfaces of the carbon particles may be modified during or immediately after resonance disintegration by contacting the carbon with an appropriate reagent. That reagent may be any of those previously described in reference to the pyrolytic char, including without limitation those that utilize Van der Walls forces; those which involve a chemical reaction between functional groups carried on a reactant molecule and those present on the carbon substrate after resonance disintegration treatment; and those organo-metallic compounds that function as coupling agents. The modified carbon products so obtained are similar in properties and uses to those produced from pyrolytic char.

The following examples will serve to illustrate the results that are obtainable through use of the inventive process.

EXAMPLE I

Figure 2A:
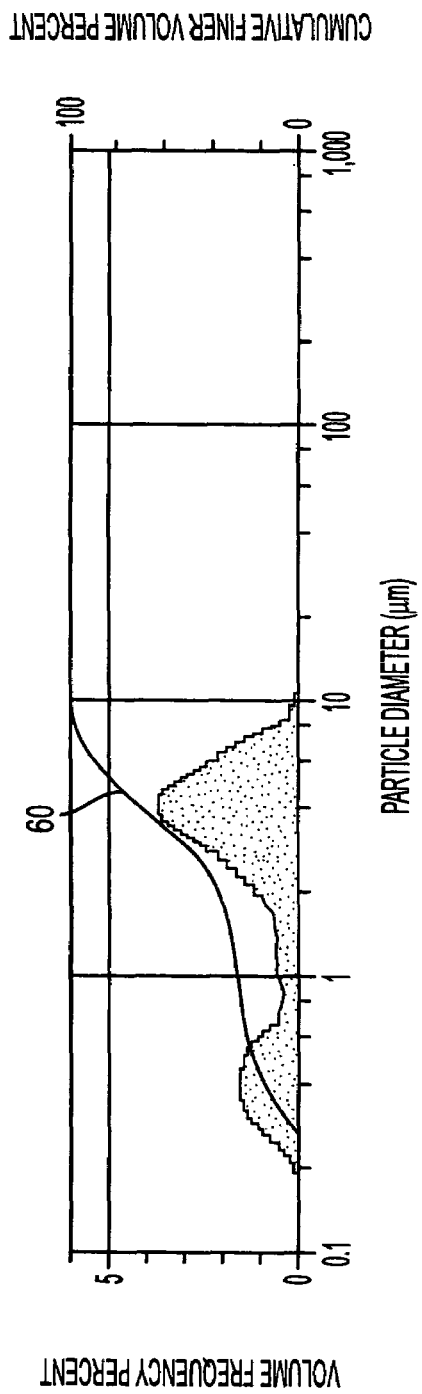
FIG. 2A is a plot of volume frequency vs. particle diameter of a standard reference carbon black dispersed in water before resonance disintegration.
Figure 2B:
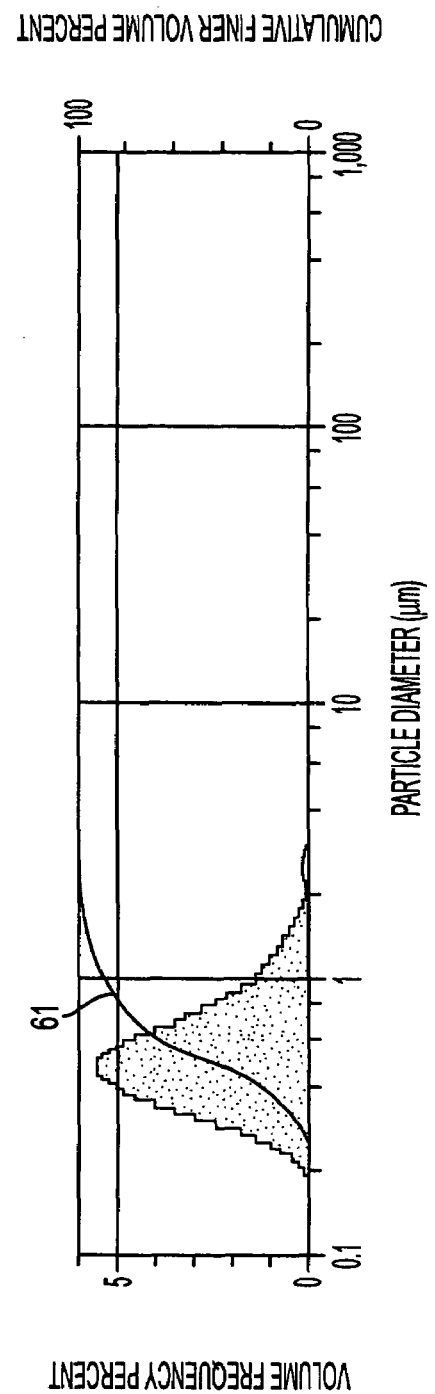
FIG. 2B is the reference carbon black of FIG. 2A dispersed in water after resonance disintegration.

Approximately 50 kg of a dry, pelleted standard reference carbon black having the trade designation N660 was subjected to resonance disintegration using a standard, production size unit. The disintegration was conducted at ambient temperature using air as the carrier gas. Samples of the product were prepared as a suspension in water and the particle size distribution before and after resonance disintegration was determined. Those data are presented in graphical form in FIG. 2 that is a plot of volume frequency vs. particle diameter. The top graph panel, FIG. 2A, depicts the particle size distribution of the reference carbon black, N660, before resonance disintegration, and the bottom panel, FIG. 2B, depicts the same carbon black after resonance disintegration. Also included on each panel is a line plot 60, 61 showing cumulative finer volume percent.

Note the logarithmic scale on which the particle diameter is plotted. The changes induced by resonance disintegration were accompanied by significant alterations in particle size distributions. In water N660 is essentially bimodal perhaps representing an equilibrium among aggregate populations. Approximately 60% of the material is centered at 4.2 µm. After resonance disintegration that peak disappears completely and 90% of the agglomerates are below one micron in particle diameter. That deagglomeration is consistent with an increase in carbonyl functions on the carbon surface upon resonance disintegration as was determined by X-ray photoelectron spectroscopy (XPS) and also indicated by the interaction of those groups with water as a strong proton donor.

Figure 3A:
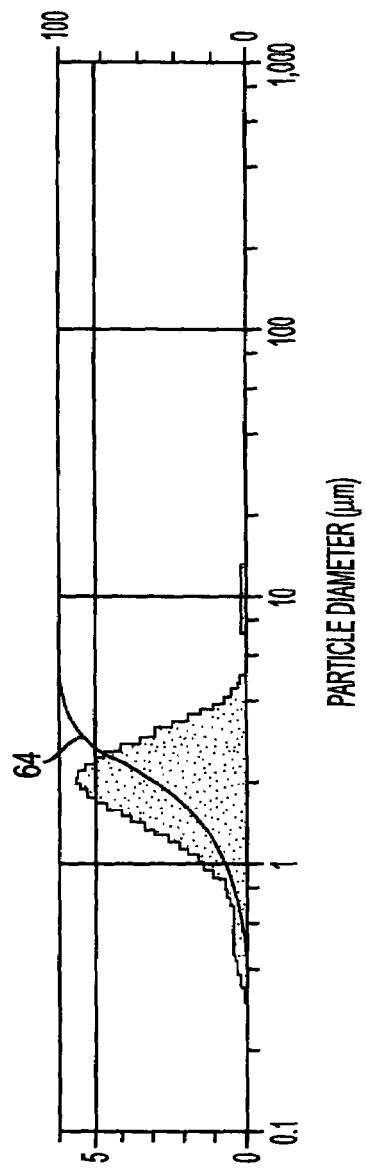
FIG. 3A is a plot of volume frequency vs. particle diameter of the standard reference carbon black of FIG. 2 dispersed in isopropanol rather than in water prior to resonance disintegration.
Figure 3B:
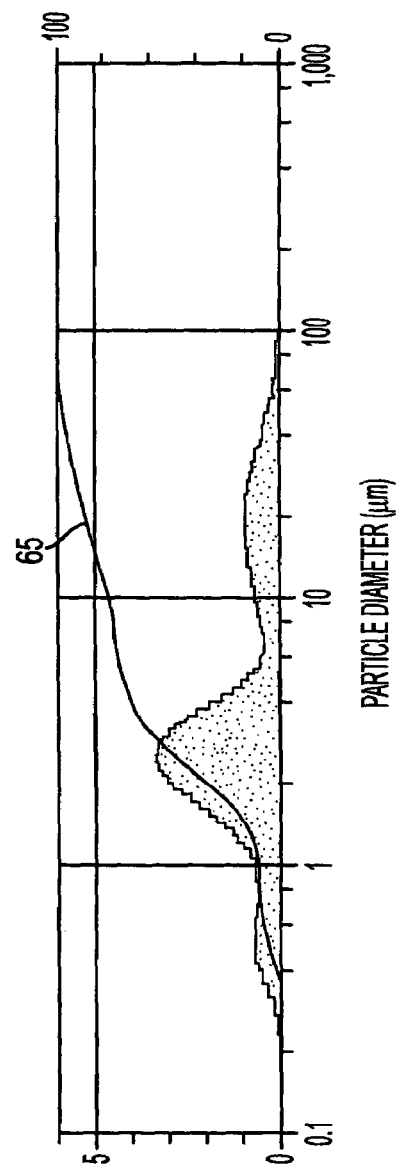
FIG. 3B is the reference carbon black of FIG. 3A dispersed in isopropanol after resonance disintegration.

In isopropanol, which is more of a proton acceptor and less of a proton donor than is water, the opposite results are found. Those data are presented in graphical form as FIG. 3. Like FIG. 2, FIG. 3 is a plot of volume frequency vs. particle diameter. As in FIG. 2, the top graph panel, FIG. 3A, depicts the particle size distribution of the reference carbon black, N660, before resonance disintegration and the bottom panel, FIG. 3B, depicts the same carbon black after resonance disintegration. Also included on each panel is a line plot 64, 65 showing cumulative finer volume percent. From essentially a single peak at 2.0 µm with only 1.1% of the carbon above 5 µm, resonance disintegration produces a trimodal distribution of particle sizes with 28% of the material above 5 µm when dispersed in isopropanol. Thus, for N660, the mean particle size of 3.0 µm found in water moves down to 1.9 µm in isopropanol. However, for N660 that has been processed by resonance disintegration, the mean particle size of 0.54 µm in water moves up to 2.9 µm in isopropanol due to the changes of surface chemistry induced by these conditions of resonance disintegration

EXAMPLE II

Approximately 50 kg of dry pyrolytic char derived from scrap tires was subjected to resonance disintegration at ambient temperature employing air as the gaseous medium under the same operating conditions as in Example I. Samples of the feed char and of the resonance-disintegrated product were prepared in both water and isopropanol and the size distribution of the samples was determined. Those data are presented graphical form in FIGS. 4 and 5, with FIG. 4 showing the water dispersed samples data and FIG. 5 showing the isopropanol dispersed samples data.

Turning now to FIG. 4, the three graph panels, FIGS. 4A, 4B and 4C, are each a plot of volume frequency vs. particle diameter. The top graph panel, FIG. 4A, depicts the particle size distribution of the pyrolytic char before resonance disintegration. The middle graph panel, FIG. 4B, shows the particle size distribution obtained after one pass through the resonance disintegration device, and the bottom graph panel, FIG. 4C, shows the particle size distribution after being twice subjected to resonance disintegration. Also shown on each panel is a line plot, 67, 68, 69, showing cumulative finer volume percent of the carbon particles. The data show a significant particle size reduction after resonance disintegration. Nearly 75% of the feed char was above 30 μm and less than 2% was submicron in size. One pass through resonance disintegration means 50 eliminated everything above 30 μm and increased the submicron fraction to one-half of the material. As is evident in comparing FIGS. 4B and 4C, a second pass of the carbon through the resonance disintegration unit did not significantly change the particle size distribution indicating the efficiency of the process.

As in FIG. 4, the three graph panels, FIGS. 5A, 5B and 5C, are each a plot of volume frequency vs. particle diameter, but dispersed in isopropanol rather than in water. The top graph panel, FIG. 5A, depicts the particle size distribution of the pyrolytic char before resonance disintegration. The middle graph, FIG. 5B, shows the particle size distribution obtained after one pass through the resonance disintegration device, and the bottom graph panel, FIG. 5C, shows the particle size distribution after the char has been twice subjected to resonance disintegration. As in FIG. 4, each panel includes a line plot, 70, 71, 72, showing cumulative finer volume percent of the carbon particles. The isopropanol dispersed samples displayed a trend similar to that of the water dispersed particles. About two-thirds of the feed char before resonance disintegration was larger than 5 μm and about 5% was smaller than 1 μm. A single pass through resonance disintegration means 50 reduced the largest particle, or agglomerate, size from over 350 μm to less than 30 μm. It increased the amount of material sized from 0.4 to 5 μm, centered at 1.5 μm, at the expense of 82% of the material over 5 μm. As is displayed in the bottom graph panel, a second pass of the carbon particles through resonance disintegration reduced the amount of material sized below 5 μm by about 32% and extended the range of largest particles from 28 to 71 μm.

Also significant is a comparison of the data presented in FIGS. 3A and 3B with that data presented in FIGS. 5B and 5C. As noted before, FIGS. 3A and 3B depict the particle size distribution in isopropanol of the reference carbon, N660, before and after resonance disintegration while FIGS. 5B and 5C depict the particle size distribution in isopropanol of pyrolytic char after one resonance disintegration treatment (FIG. 5B) and after a second resonance disintegration treatment (FIG. 5C.) Note the close likeness in size distribution of the reference carbon to the resonance disintegration-processed pyrolytic char and also the remarkable similarity in size distribution of the reference carbon after resonance disintegration to the size distribution of the pyrolytic char after a second resonance disintegration processing. Those similarities indicate a close sameness of properties between standard carbons and the carbon produced by the process of this invention.

EXAMPLE III

Portions of the carbon product obtained after resonance disintegration were supplied to several ink manufacturers for evaluation. The particle dimensions of the carbon was found to be consistent with ink applications. Any non-carbon grit or inorganic material present in the char was also so finely divided by the resonance disintegration that it did not pose a significant abrasion problem. The carbon was found to disperse well in a wide range of solvents including water, alcohol, toluene, and mineral spirits to form inks having an excellent matte finish with uniform ink distribution and good coverage. The ease of dispersion in water is considered to be especially significant in view of the environmental trend toward reducing use of solvent-based inks in favor of inks formulated with a water base.

EXAMPLE IV

A sample of the carbon product obtained by resonance disintegration of pyrolytic char as in Example II was treated with a liquid alkyl titanate by spraying the atomized liquid into a fluidized suspension of carbon particles in a Henschel mixer. The treated composition was then mixed with sufficient water to form a viscous paste containing about 35% solids. The paste was stable with no separation of liquid and solids upon prolonged (>3 months) standing. The paste was thereafter easily dispersed into additional water to form an ink composition having any desired solids loading, thus indicating its usefulness as an ink concentrate or as a master batch formulation for compounding with rubbers and plastics.

EXAMPLE V

A series of twenty-two pyrolysis runs, using shredded scrap tires as feed, were conducted over a 46-day period using a full size retort. Nine of the runs were made to establish optimum, or standard, operating conditions while the remaining thirteen runs were made at the established, standard operating conditions. Those standard operating conditions included a maximum exit temperature of the pyrolysis exit gas of 540° C.; a run time (from time of charging the retort to the time that the maximum exit temperature was reached) of 3.5 hours; and a charge weight of 4.4 metric tons. Process parameters that were varied included ending the pyrolysis at temperatures above and below the standard; reducing the charge weight; and shortening and lengthening the pyrolysis time.

Figure 6:
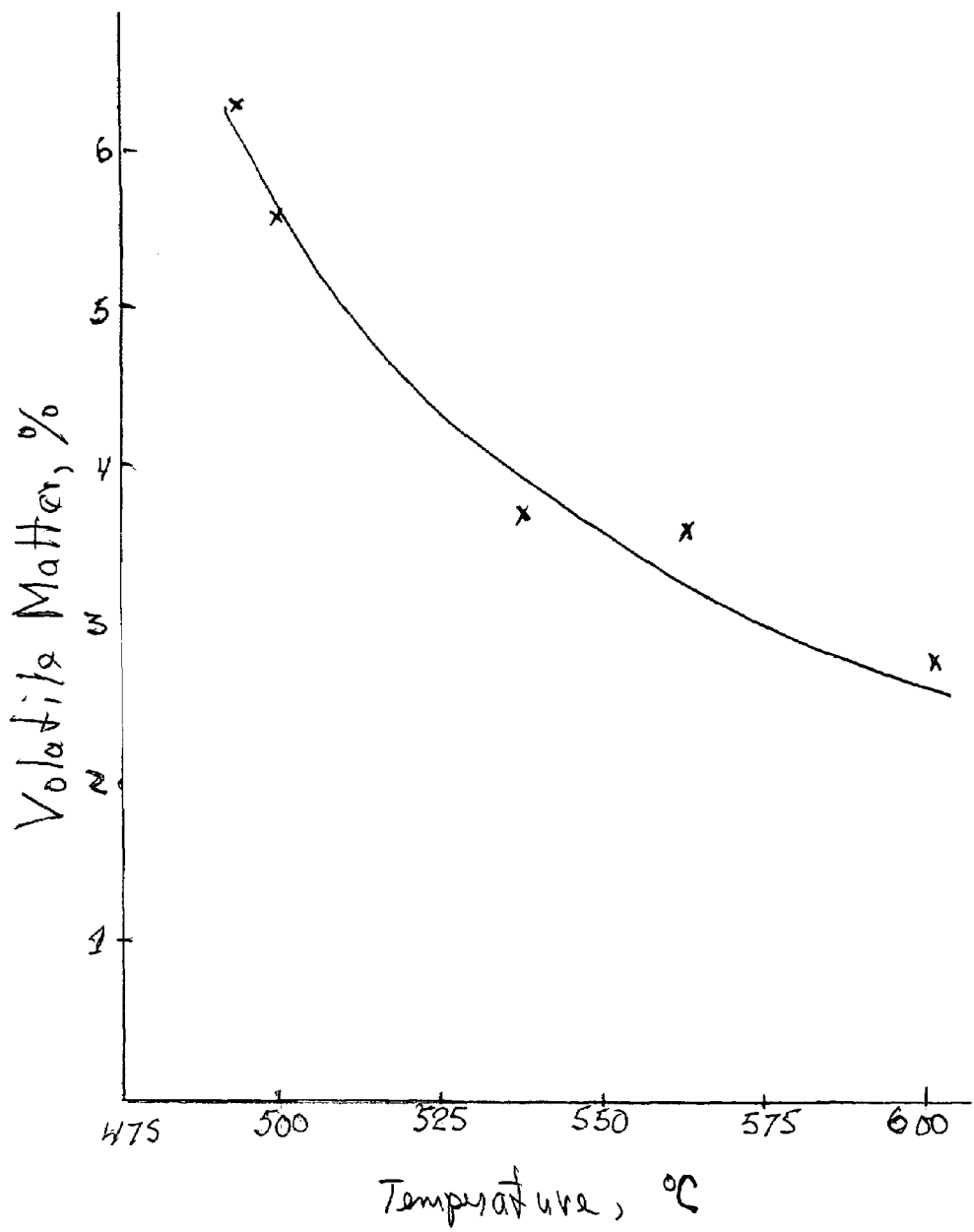
FIG. 6 is a plot of the pyrolysis gas exit temperature against residual volatile matter in the char.

It had been determined that quality carbon products, suitable as a pigment for printing inks and for compounding in rubber, required a char feed that contained less than about 5% volatile matter. The trial pyrolysis runs established that there was a direct correlation between the pyrolysis gas exit temperature and the volatile matter remaining in the char, thus allowing the use of pyrolysis gas temperature to determine the pyrolysis end point. That correlation is presented in FIG. 6 as a plot of % volatile matter vs. temperature.

All thirteen standard runs employed a run time of 3.5 hours, and for those runs the pyrolysis exit gas temperature varied from 522° C. to 546° C., with the average being 540° C. The volatile materials remaining in the char ranged from 3.2% to 4.5%, with an average of 3.7%. Char yield, calculated on the basis of charge weight, ranged from 34.0% to 35.9% with an average of 34.9%.

It was also observed from the experimental runs that, as temperature increased, the char yield decreased as did the level of residual volatile materials in the char. Decreasing the charge weight (from 4.4 to 3.0 metric tons) had no significant effect on any of the measured parameters, and neither did extending the time of pyrolysis from 3.5 to 4 hours. Decreasing the pyrolysis time to three hours resulted in an increase in char yield and in residual volatile matter, thus indicating an incomplete pyrolysis. Adding sawdust to the shredded rubber charge in amounts up to 8% increased the char yield somewhat, and decreased the volatile matter, but did not otherwise affect the process or the product.

EXAMPLE VI

Figure 7:
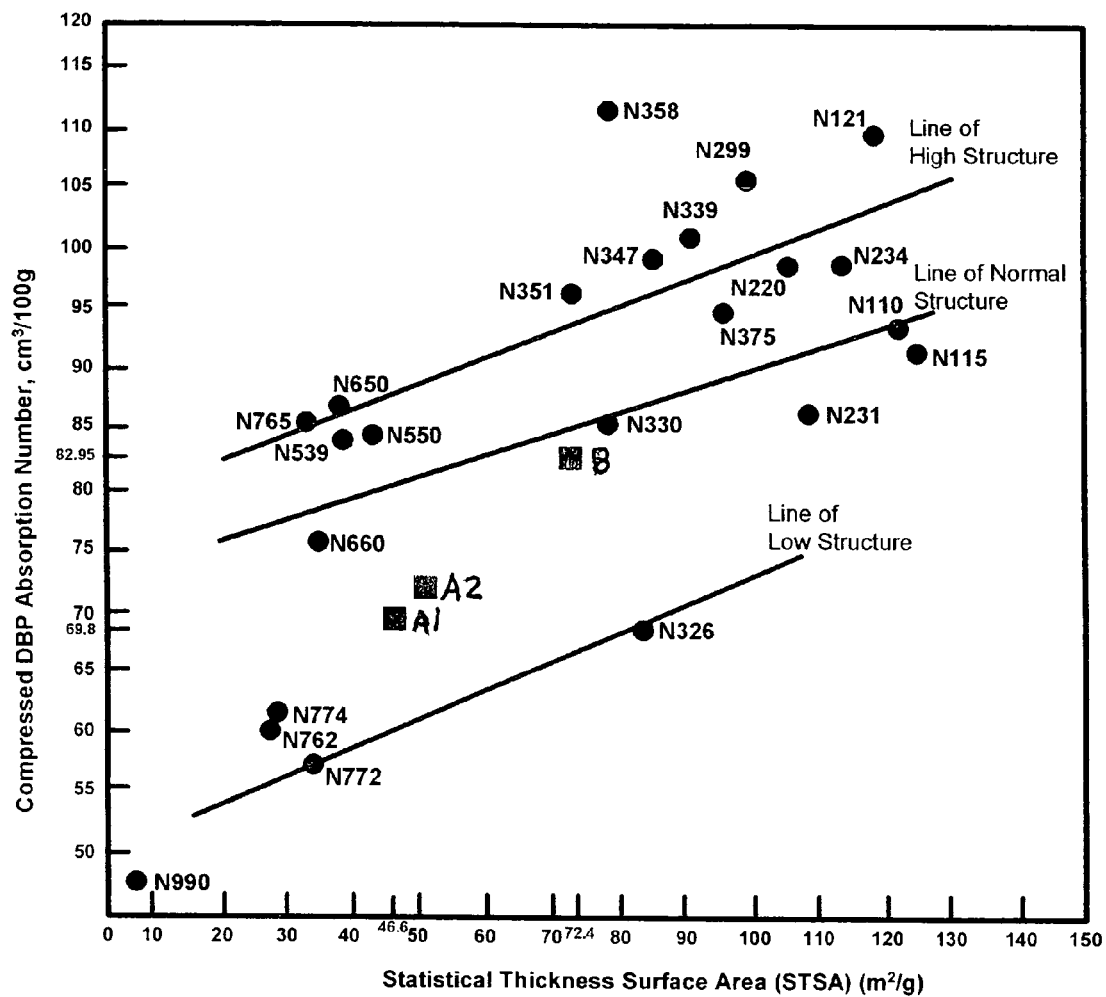
FIG. 7 is a comparison of the characteristics of the carbon product of this invention to those of standard furnace carbon blacks used in the rubber and other industries.

Shredded scrap tires were pyrolyzed under standard conditions, as defined in the previous example, to obtain a char. A first char portion was comminuted using a resonance disintegration device of a particular configuration, and a second char portion was comminuted using a resonance disintegration device having a different configuration. The properties of the resulting carbon products were examined and the results are shown graphically in FIG. 7 in the context of the properties of standard carbon blacks that are commonly used in rubbers and plastics. Carbon product from the first char fraction is indicated thus, ■, and is labeled A1. Similarly, the carbon product from the second char portion is labeled A2. The plot indicates that the differences between carbon products, A1 and A2, is not significant, and that both exhibit properties similar to those of carbon blacks of low to normal structure. Further, the nearest neighbors to samples A1 and A2 among the standard carbon blacks that are used in very large quantities for compounding rubber, in terms of properties, include N660, N550, and members of the N700 series.

Another char sample was obtained by pyrolyzing a powdered rubber from the buffing of truck tires in preparation for retreading. It is conventional to use a number of different carbon blacks in tire manufacture; a different carbon black is ordinarily used in the tread stock than is used in the side wall, for example. Hence, the char obtained by pyrolyzing this material could be expected to have somewhat different properties than that obtained from shredded whole tires. The char sample was comminuted using resonance disintegration to form a carbon product. The properties of the carbon product were examined and the results are plotted in FIG. 7 as data point B. As expected, there were decided differences in that Sample B displayed a higher surface area than did samples A1 and A2.

EXAMPLE VII

A portion of the char used in the Example VI tests was comminuted using the resonance disintegrator configuration that produced sample A2. Carbon product recovered from the disintegrator had the particle size distribution shown in FIG. 4B, wherein 50% of the material was below 1 micron and all particles were below 30 microns.

A second portion of the same char was comminuted using the resonance disintegrator configuration that produced sample A1. In this instance, the disintegrator discharge, comprising finely divided char carried in an air stream, was first passed through a cyclone separator and then though a baghouse filter means. A first carbon product was recovered from the cyclone discharge and was labeled cyclone product. A second, mostly finer, carbon was recovered in the baghouse, and this sample was labeled baghouse product.

Yet another portion of the same char was comminuted using a fluid energy, or jet, mill of the general type employed by Gotshall as was described in his U.S. Pat. No. 3,644,131. The comminuted product recovered from the mill was labeled jet mill product.

The three samples, jet mill product, cyclone product, and baghouse product, had the particle size characteristics shown in the following table.

TABLE I

Product Size Characteristics

| | $d_{10}$ (μ) | $d_{50}$ (μ) | $d_{90}$ (μ) | $d_{99}$ (μ) | 100% @ (μ) | Spec. surf. area ($m^2/g$) |
|---|---|---|---|---|---|---|
| Jet mill product | 0.85 | 2.1 | 4.7 | 6.8 | 8 | 3.6 |
| Cyclone product | 0.74 | 2.0 | 6.1 | 9.3 | 12-15 | 3.8 |
| Baghouse product | 0.81 | 2.2 | 5.6 | 8.4 | 12 | 3.6 |

Although the particle size distribution among the three samples is quite similar, it is important to note that the baghouse product displays an overall smaller particle size and greater specific surface area than does the jet mill product.

A series of additional tests were conducted to explore how well the carbon products dispersed in rubber, utilizing standard test procedures. This is a most important test because compounded rubbers typically contain about 17 to 40% by weight of carbon. If the carbon does not disperse well, it forms localized concentrations, or pockets, of unmixed carbon in the rubber matrix. Such carbon pockets cause defects that lower the physical and mechanical properties of the rubber, making it unsuitable for use in the manufacture of auto and truck tires. Tires are the largest market for carbon products.

Samples tested were identical to those characterized in Table I, except that a sample of commercial carbon black N550 was included for comparison purposes. Carbon black N550 provides a useful comparison as it is widely used in the rubber industry and is known to disperse very well in rubber. Results obtained are set out in the following Table.

TABLE II

Dispersion of Carbon and Carbon Products in SBR-3 Rubber

| | Aver. particle area ($\mu m^2$) | Max. particle area ($\mu m^2$) | Dispersion coeff. (%) |
|---|---|---|---|
| N550 | 115 | 1003 | 96 |
| Jet mill product | 116 | 6440 | 88 |
| Cyclone product | 99 | 985 | 89 |
| Baghouse product | 108 | 1729 | 93 |

The sample of N550 carbon black displayed the highest dispersion coefficient at 96%, but was followed closely by the baghouse product sample at a dispersion coefficient of 93%. The importance of particle size, and particularly of maximum particle size, in obtaining a high dispersion coefficient becomes clear upon examining the data presented in Tables I and II. The jet mill product displayed an average particle area essentially the same as that of N550, but had a maximum particle area much greater than that of the N550, resulting in a lesser dispersion coefficient; 88% as compared to 96% for the N550. The baghouse sample had a smaller average particle area than either the jet mill product or the N550 and had a maximum particle area and a dispersion coefficient intermediate the two. Photomicrographs of slices of rubber with carbon added showed essentially no difference between N550 and the baghouse product. There was a significant difference between N550 and the cyclone material which formed "pockets" of carbon in the rubber.

It has been concluded from a study of these and other test data, as well as from empirical observations, that if a char-derived carbon product has a particle size distribution in which essentially 100% of the particles are smaller than about 8 microns, as is attainable using the techniques herein described, and if few or any larger char particles are present, it will compound with rubber essentially as well as does commercial carbon blacks, displaying a dispersion coefficient of 87% or greater. When the quality of the carbon product is that high, it can be substituted for carbon black without changing or modifying the conditions used by the rubber manufacturers.

The carbon product of this invention has been shown to be useful as a pigment in printing inks and in many other applications that employ carbon black as a pigment or as a filler, particularly in the rubber and tire markets. Other variations and modifications of the described embodiments will be apparent to those skilled in the art without departing from the spirit and scope of this invention, the scope of which is defined in the following claims.

The invention claimed is:

1. A method for preparing carbon products from discarded rubber comprising the steps of:
    pyrolyzing the rubber in an externally heated retort for a time sufficient to completely decompose the rubber to form a char which contains less than 5% volatile matter and to produce a temperature of pyrolysis gases exiting the retort at least 500° C.; and
    subjecting said char to resonance disintegration of an intensity sufficient to produce an ultrafine, particulate, carbon product, said carbon product characterized in having a particle size distribution when dispersed in water such that at least 75% by volume of the powder particles are less than 10 μm in diameter.

2. The method of claim 1 wherein said retort is rotated during pyrolysis.

3. The method of claim 1 wherein said discarded rubber comprises debeaded, shredded scrap tires and wherein the pyrolysis time exceeds three hours.

4. The method of claim 3 wherein the pyrolysis is conducted in batch fashion; wherein a charge of shredded scrap is loaded into said retort at ambient temperature; and wherein the charge within said retort is heated at a rate such that the temperature of pyrolysis gases exiting the retort exceeds 500° C. in approximately 3.5 hours.

5. The method of claim 4 wherein the charge within said retort is heated at a rate such that it reaches a temperature of 330° C. in approximately 1 hour; reaches a temperature of 450° C. in 2.9 to 3.0 hours; and attains a final temperature of 540° C. in approximately 3.5 hours, all of said temperatures measured as the temperature of pyrolysis gases exiting the retort.

6. The method of claim 1 wherein the intensity of said resonance disintegration is sufficient to produce a carbon product having a particle size such that at least 99% of the particles are smaller than 10 microns.

7. The method of claim 1 wherein the intensity of said resonance disintegration is sufficient to produce a carbon product in which essentially 100% of the carbon product particles are smaller than about 8 microns and wherein the dispersion coefficient of said carbon product is greater than 87%.

8. The method of claim 1 wherein said resonance disintegration is conducted at ambient temperature in an air medium.

9. The method of claim 1 wherein particles of said carbon product are subjected to a further treatment that modifies the surface properties of said particles, the treatment comprising contacting the carbon product particles with a reactant compound during or after resonance disintegration.

10. The method of claim 9 wherein said treatment comprises a chemical reaction between functional groups carried on molecules of said reactant compound and functional groups present on carbon product particle surfaces.

11. The method of claim 10 wherein said reactant compound is selected from the group consisting of peroxides, chlorosilanes, and acid chlorides.

12. The method of claim 9 wherein said reactant compound is an organo-metallic coupling agent that is selected from the group consisting of liquid, multi-functional titanates, zirconates and aluminates.

13. The method of claim 12 wherein the amount of coupling agent is in the range of 0.1 to 1.0% by weight of carbon product particles, and wherein said treated particles are thereafter dispersed in a liquid vehicle to form a suspension.

14. The method of claim 13 wherein the liquid vehicle is selected from the group consisting of water, alcohols, toluene, and mineral spirits, and wherein said suspension comprises an ink.

15. A method for making a particulate carbon product that is suitable for use in rubber compounding comprising:
    loading a charge of rubber into an externally heated, rotating retort;
    heating said rubber charge for at least three hours to pyrolyze and to completely decompose the rubber, and continuing said heating until the temperature of gases exiting the retort exceeds 500° C. to thereby produce a char which contains less than 5% volatile matter;
    cooling said char and removing it from the retort; and
    subjecting the cooled char to resonance disintegration of an intensity sufficient to produce a carbon product powder in which essentially 100% of the carbon product particles are smaller than about 8 microns and which displays a dispersion coefficient in rubber of greater than 87%.

* * * * *